United States Patent
Che et al.

(10) Patent No.: US 6,924,063 B2
(45) Date of Patent: Aug. 2, 2005

(54) SECONDARY POWER SOURCE

(75) Inventors: Yong Che, Ann Arbor, MI (US); Takeshi Morimoto, Yokohama (JP); Manabu Tsushima, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 388 days.

(21) Appl. No.: 10/091,502

(22) Filed: Mar. 7, 2002

(65) Prior Publication Data

US 2002/0164529 A1 Nov. 7, 2002

(30) Foreign Application Priority Data

Mar. 7, 2001 (JP) ........................................ 2001-063627

(51) Int. Cl.$^7$ ................................................ H01M 4/58
(52) U.S. Cl. ................................. 429/231.8; 429/231.4; 429/217
(58) Field of Search .......................... 429/231.4, 231.8, 429/324, 209, 217, 338, 342, 340

(56) References Cited

U.S. PATENT DOCUMENTS

| | | | |
|---|---|---|---|
| 5,953,204 A | | 9/1999 | Suhara et al. |
| 6,103,373 A | * | 8/2000 | Nishimura et al. .......... 428/368 |
| 6,294,292 B1 | | 9/2001 | Tsushima et al. |
| 6,399,251 B1 | * | 6/2002 | Honbo et al. .......... 429/231.95 |
| 6,558,846 B1 | * | 5/2003 | Tsushima et al. ........ 429/231.8 |

FOREIGN PATENT DOCUMENTS

JP    2000-090972    *    3/2000    .......... H01M/10/40

OTHER PUBLICATIONS

U.S. Appl. No. 10/092,988, filed Mar. 8, 2002, Che et al.
Takeshi Morimoto, Patent Abstracts of Japan, Publication No. 08107048, Publication Date: Apr. 23, 1996, vol. 1996, No. 8.
Tomohiro Iguchi, Patent Abstracts of Japan, Publication No. 2000138058, Publication Date: May 16, 2000, vol. 2000, No. 8.
Yoshio Kawai, Patent Abstracts of Japan, Publication No. 01014882, Publication Date: Jan. 19, 1989, vol. 013, No. 195.
Masayuki Nagamine, Patent Abstracts of Japan, Publication No. 09293504, Publication Date: Nov. 11, 1997, vol. 1998, No. 3.
Tomohito Okamoto et al, Chemical Abstract, "Slurry for forming secondary lithium battery anode coatings and secondary lithium batteries", AN: 133:284176 CA, XP–002246535.

* cited by examiner

*Primary Examiner*—Raymond Alejandro
(74) *Attorney, Agent, or Firm*—Oblon, Spivak, McClelland, Maier & Neustadt, P.C.

(57) ABSTRACT

A secondary power source, which comprises a positive electrode containing activated carbon, a negative electrode containing a carbon material capable of doping and undoping lithium ions, and an organic electrolyte containing a lithium salt, wherein the negative electrode has a density of from 0.6 to 1.2 g/cm$^3$.

16 Claims, 1 Drawing Sheet

SECONDARY POWER SOURCE

Figure 1:
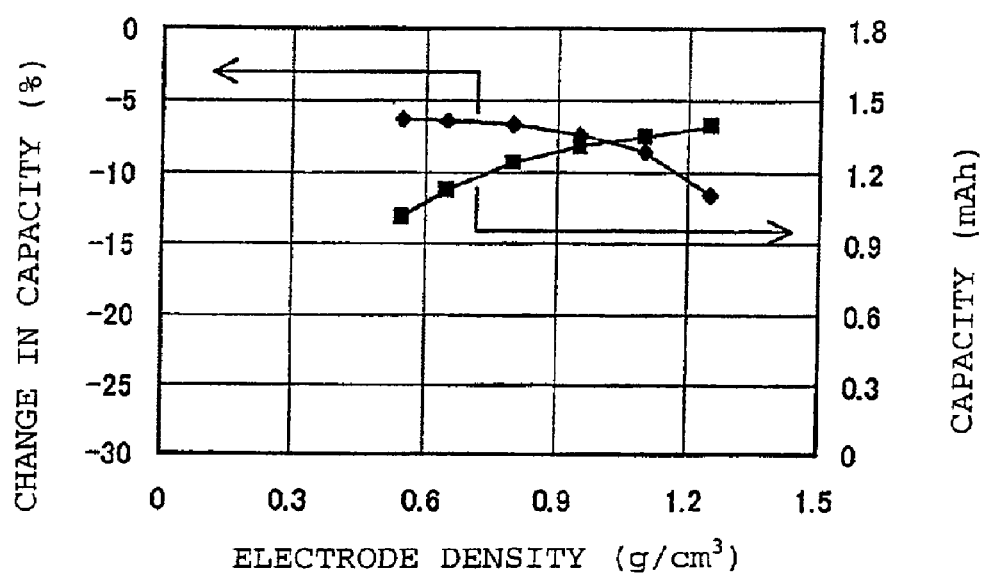

The present invention relates to a secondary power source having a high upper limit voltage, a large capacity and a high reliability for large current charge and discharge cycles.

As electrodes for a conventional electric double layer capacitor, polarizable electrodes composed mainly of activated carbon are used for both the positive electrode and the negative electrode. The upper limit voltage of an electric double layer capacitor is 1.2 V when an aqueous electrolyte is used, or from 2.5 to 3.3 V when an organic electrolyte is used. The energy of the electric double layer capacitor is proportional to the square of the upper limit voltage. Accordingly, an organic electrolyte having a high upper limit voltage provides a high energy as compared with an aqueous electrolyte. However, even with an electric double layer capacitor employing an organic electrolyte, the energy density is as low as at most 1/10 of a secondary cell such as a lead-acid battery, and further improvement of the energy density is required.

Whereas, JP-A-64-14882 proposes a secondary power source for an upper limit voltage of 3 V, which employs an electrode composed mainly of activated carbon as a positive electrode and as a negative electrode, an electrode having lithium ions preliminarily doped in a carbon material having a lattice spacing of [002] face of from 0.338 to 0.356 nm as measured by X-ray diffraction. Further, JP-A-8-107048 proposes a battery which employs, for a negative electrode, a carbon material having lithium ions preliminarily doped by a chemical method or by an electrochemical method in a carbon material capable of doping and undoping lithium ions. Still further, JP-A-9-55342 proposes a secondary power source for an upper limit voltage of 4 V, which has a negative electrode having a carbon material capable of doping and undoping lithium ions supported on a porous current collector which does not form an alloy with lithium.

A secondary power source which employs activated carbon for a positive electrode and a carbon material capable of doping and undoping lithium ions for a negative electrode, provides a higher upper limit voltage and a larger capacity than a conventional electric double layer capacitor which employs activated carbon for both positive and negative electrodes. Particularly when a graphite type carbon material with which the potential for doping and undoping lithium ions is low is used for the negative electrode of the secondary power source, a larger capacity can be obtained.

Further, a lithium ion secondary cell is available as a high-performance secondary power source other than the electric double layer capacitor and the above secondary power source. The lithium ion secondary cell has characteristics such that it can be operated at a higher voltage and it provides a larger capacity as compared with the electric double layer capacitor. However, it has had problems such that the resistance is high, and the useful life due to quick charge and discharge cycles is very short as compared with the electric double layer capacitor.

A secondary power source which employs activated carbon for a positive electrode and a carbon material capable of doping and undoping lithium ions for a negative electrode is excellent in durability against quick charge and discharge cycles as compared with a lithium ion secondary cell, however, it has an inadequate durability against quick charge and discharge cycles as compared with an electric double layer capacitor. This is considered to be attributable to a negative electrode having a construction different from the electric double layer capacitor and a difference in an electrode reaction at the negative electrode.

Under these circumstances, it is an object of the present invention to provide a secondary power source which has quick charge and discharge capability, provides a high upper limit voltage and a large capacity and has a high energy density and which has a high charge and discharge cycle reliability, particularly by studies on a negative electrode.

The present invention provides a secondary power source, which comprises a positive electrode containing activated carbon, a negative electrode containing a carbon material capable of doping and undoping lithium ions, and an organic electrolyte containing a lithium salt, wherein the negative electrode has an electrode density of from 0.6 to 1.2 $g/cm^3$.

Now, the present invention will be described in detail with reference to the preferred embodiments.

In the accompanying drawing:

FIG. 1 is a diagram illustrating the relation of the density of a negative electrode to the initial capacity and the change in capacity in Examples.

In this specification, a negative electrode assembly is one obtained by bonding and integrating a current collector and a negative electrode composed mainly of a carbon material capable of doping and undoping lithium ions. Likewise, a positive electrode assembly is one obtained by bonding and integrating a current collector and a positive electrode. A secondary cell as well as an electric double layer capacitor is a kind of a secondary power source. However, in this specification, a secondary power source of a specific construction wherein the positive electrode contains activated carbon and the negative electrode contains a carbon material capable of doping and undoping lithium ions, will be referred to simply as a secondary power source.

In a lithium ion secondary cell, the positive electrode is an electrode composed mainly of a lithium-containing transition metal oxide, and the negative electrode is an electrode composed mainly of a carbon material capable of doping and undoping lithium ions. Lithium ions are undoped from the lithium-containing transition metal oxide in the positive electrode by charging and doped in the carbon material capable of doping and undoping lithium ions in the negative electrode, and lithium ions are undoped from the negative electrode by discharging and doped in the positive electrode. Accordingly, lithium ions in an electrolyte are not substantially involved in charge and discharge of the cell.

On the other hand, in the secondary power source of the present invention, anions in the electrolyte are adsorbed on the activated carbon in the positive electrode by charging, and lithium ions in the electrolyte are doped in the carbon material capable of doping and undoping lithium ions in the negative electrode. Further, by discharging, lithium ions are undoped from the negative electrode and anions are desorbed from the positive electrode. Namely, in the secondary power source of the present invention, the solute in the electrolyte is substantially involved in the charge and discharge, and the mechanism of the charge and discharge is different from that of the lithium ion secondary cell. Further, doping and undoping of lithium ions are not involved in the positive electrode of the secondary power source of the invention, which is different from the lithium ion secondary cell, and the positive electrode does not deteriorate due to doping and undoping of lithium ions, and accordingly the secondary power source of the present invention is less likely to deteriorate by charge and discharge cycles as compared with the lithium ion secondary cell, and is excellent in a long-term reliability.

In the case of the secondary power source of the present invention, it is considered that the durability against quick charge and discharge cycles greatly depends on the negative electrode and is influenced by the type of the carbon material for the negative electrode and properties of the negative electrode formed.

The present inventors have conducted extensive studies and as a result, have found that there is a correlation between the density of the negative electrode and cycle performance of quick charge and discharge. Namely, they have found that the lower the density of the negative electrode, the lower the rate of decrease in capacity due to quick charge and discharge, and when the density becomes lower than a predetermined value, the rate of decrease in capacity becomes substantially constant.

The decrease in capacity due to quick charge and discharge cycle is considered to be attributable to non-uniformity and electrolyte-absorbing properties of the negative electrode. For example, it is considered that non-uniform distribution of the electrolyte in the electrode causes non-uniform potential distribution in the electrode at the time of charging and discharging. Namely, it is considered that at a portion of the negative electrode which is not adequately impregnated with the electrolyte, the potential rapidly rise or fall locally due to quick charge and discharge, whereby a side reaction such as deposition of lithium metal or decomposition of the electrolyte is likely to take place, thus leading to decrease in capacity. On the other hand, it is considered that such a decrease in capacity can be reduced if the entire carbon particles as an active material in the negative electrode can be impregnated with the electrolyte. The density (of the formed product) of the negative electrode relates to electrolyte-absorbing properties (wettability) of the negative electrode, and the lower the density, the higher the electrolyte-absorbing properties, and accordingly the lower the density of the negative electrode, the smaller the decrease in capacity due to quick charge and discharge cycles.

Conventionally, the density of the negative electrode tends to be increased so as to increase the amount of the active substance per unit volume to increase the initial capacity. However, taking durability against quick charge and discharge cycles into consideration as described above, it is required to adjust the density of the negative electrode so that it is not too high.

In the present invention, the density of the negative electrode is from 0.6 to 1.2 g/cm$^3$ from the above viewpoint, and the density of the negative electrode is more preferably from 0.7 to 1.0 g/cm$^3$. If the density of the negative electrode exceeds 1.2 g/cm$^3$, the entire electrode is less likely to be impregnated with the electrolyte as described above, and the rate of decrease in capacity due to quick charge and discharge cycles tends to be high. On the other hand, if the density of the negative electrode is less than 0.6 g/cm$^3$, the amount of the active substance of the negative electrode per unit volume tends to decrease, thus leading to decrease in the energy density of the cell.

In the present invention, the carbon material capable of doping and undoping lithium ions preferably has a lattice spacing of [002] face of from 0.335 to 0.410 nm as measured by X-ray diffraction. The carbon material capable of doping and undoping lithium ions may, for example, be natural graphite, artificial graphite, petroleum coke, a meso phase pitch-type carbon material, a hard (non graphitizable) carbon material, a composite material of a graphite type material and a hard (non graphitizable) carbon material or a mixed material, and any one of such materials may be employed.

Among carbon materials capable of doping and undoping lithium ions, vapor grown carbon fibers having a lattice spacing of [002] face at a level of from 0.336 to 0.337 nm are preferably incorporated into the negative electrode, since they have a high conductivity. When the vapor grown carbon fibers are added as an active material and conductive material to the negative electrode, not only the conductivity of the negative electrode increases, but also the density of the negative electrode can be made low, whereby uniformity of the negative electrode increases, and the cycle performance of the secondary power source against quick charge and discharge tend to improve. The amount of the vapor grown carbon fibers contained in the negative electrode is preferably from 5 to 30%, more preferably from 8 to 15%, based on the total mass of the negative electrode. If it is less than 5%, the conductivity of the negative electrode may not adequately be increased. On the other hand, if the amount of the vapor grown carbon fibers added is larger than 30%, no further increase in the conductivity can be expected any more. Further, the amount of the vapor grown carbon fibers is preferably small in view of cost.

The negative electrode assembly in the present invention can be obtained in such a manner that polyvinylidene fluoride, polyamideimide, polyimide or the like is used as a binder, a carbon material for the active material of the negative electrode (preferably containing vapor grown carbon fibers) is dispersed in a solution having the resin as the binder or a precursor thereof dissolved in an organic solvent to prepare a slurry, which is coated on a current collector and dried, preferably followed by rolling by a roll pressing machine.

In a case where the negative electrode assembly is obtained by the above method, the density of the negative electrode can be controlled by adjusting e.g. the amount of the vapor grown carbon fibers added, the concentration of the slurry and the pressing pressure.

In the method for coating the slurry on the current collector to prepare the negative electrode assembly, the solvent for dissolving the resin for the binder or the precursor thereof is not particularly limited. However, N-methyl-2-pyrrolidone (hereinafter referred to as NMP) is preferred, since it is readily available and capable of readily dissolving the resin constituting the binder or the precursor thereof. Here, the precursor for polyamideimide or the precursor for polyimide means one which will be converted to polyvinylidene fluoride, polyamideimide or polyimide, respectively, by polymerization under heating. Among these binders, particularly preferred is polyvinylidene fluoride with which an electrode excellent in electrolyte-absorbing properties is likely to be prepared.

In the present invention, the binder contained in the total mass of the negative electrode is preferably from 4 to 30%. If the amount of the binder is larger than this range, the negative electrode capacity tends to be small. If the amount of the binder is smaller than this range, the effect as the binder tends to be weak, and the negative electrode and the current collector are likely to be separated. More preferably, the amount is from 7 to 25%.

In the present invention, the activated carbon contained in the positive electrode preferably has a specific surface area of from 800 to 3,000 m$^2$/g. The starting material and the activation conditions for the activated carbon are not particularly limited. For example, the starting material may be a coconut shell, a phenol resin or a petroleum coke, and the activation method may, for example, be a steam-activation method or a molten alkali activation method. Particularly preferred is activated carbon obtained by steam activation using, as the starting material, a coconut shell or a phenol resin. In order to reduce the resistance of the positive electrode, it is preferred to incorporate conductive carbon black or graphite as a conductive material into the positive electrode. In such a case, the conductive material is contained in an amount of preferably from 0.1 to 20% based on the total mass of the positive electrode.

As a method for preparing the positive electrode assembly, a method may, for example, be mentioned wherein polytetrafluoroethylene as a binder is mixed and kneaded with a mixture comprising an activated carbon powder and a conductive material, followed by forming into a sheet shape to obtain a positive electrode, which is then bonded to a current collector by means of a conductive adhesive. Otherwise, in the same manner as the negative electrode assembly, an activated carbon powder and a conductive material powder may be dispersed in a varnish having polyvinylidene fluoride, polyamideimide, polyimide or the like dissolved as a binder, and the dispersion may be coated on a current collector by e.g. a doctor blade method, followed by drying. The proportion by mass of the binder contained in the positive electrode is preferably from 1 to 20% from the viewpoint of the balance between the strength of the positive electrode assembly and properties such as capacity.

The lithium salt contained in the organic electrolyte in the present invention is preferably at least one member selected from the group consisting of $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, $LiAsF_6$ and $LiSbF_6$. The concentration of the lithium salt in the electrolyte is preferably from 0.1 to 2.5 mol/l, more preferably from 0.5 to 2 mol/l.

The solvent in the electrolyte of the present invention may, for example, be ethylene carbonate, propylene carbonate, butylene carbonate, dimethyl carbonate, ethylmethyl carbonate, diethyl carbonate, sulfolane and dimethoxyethane. These may be used alone or as a mixed solvent of at least two.

Now, the present invention will be described in further detail with reference to Examples (Examples 1 to 5) and Comparative Examples (Examples 6 and 7). However, it should be understood that the present invention is by no means restricted by such Examples.

The preparation of cells and the measurements in Examples 1 to 7 were carried out in an argon glove box with a dewpoint of at most −60° C. in all cases.

EXAMPLE 1

As a carbon material capable of doping and undoping lithium ions, hard (non graphitizable) carbon having a lattice spacing of [002] face of 0.373 nm and vapor grown carbon fibers having a lattice spacing of [002] face of 0.336 nm were mixed in a mass ratio of 8:1, and the obtained mixture was dispersed in a solution having polyvinylidene fluoride dissolved in NMP. This dispersion was coated on a current collector made of cupper and dried to form a negative electrode on the current collector. This assembly was further pressed by a roll pressing machine so that the electrode density was 0.8 g/cm$^3$, the area of the negative electrode was 1 cm×1 cm and the thickness was from 15 to 30 μm, and a heat treatment was carried out under reduced pressure at 150° C. for 10 hours to obtain a negative electrode assembly. Here, in the negative electrode, the mass ratio of the carbon material capable of doping and undoping lithium ions and polyvinylidene fluoride was made to be 9:1.

Then, a mixture obtained by mixing activated carbon having a specific surface area of 2,000 m$^2$/g obtained by steam-activation using a phenol resin as a starting material, conductive carbon black and polytetrafluoroethylene as a binder in a mass ratio of 8:1:1, was added to ethanol, followed by kneading, rolling and drying in vacuum at 200° C. for 2 hours to obtain an electrode sheet having a thickness of 150 μm. From this electrode sheet, an electrode of 1 cm×1 cm was obtained and was bonded to a current collector made of an aluminum foil by means of a conductive adhesive using polyamideimide as a binder, followed by heat treatment under reduced pressure at 260° C. for 10 hours to obtain a positive electrode assembly.

The positive electrode assembly and the negative electrode assembly thus obtained were disposed to face each other with a polypropylene separator interposed therebetween, and were thoroughly impregnated with the electrolyte, to obtain a secondary power source. A solution having $LiBF_4$ in a concentration of 1 mol/l dissolved in a mixed solvent of ethylene carbonate and ethylmethyl carbonate (mass ratio 1:1) was used as an electrolyte, and the above secondary power source was thoroughly impregnated with the electrolyte, whereupon the initial capacity was measured within a range of from 4.2 V to 2.75 V. Thereafter, a charge and discharge cycle test was carried out at a charge and discharge current of 10 mA/cm$^2$ within a range of from 4.0 V to 2.75 V, and the capacity after 2,000 cycles was measured, whereupon the change in capacity was calculated. The results are shown in Table 1.

EXAMPLE 2

A secondary power source was obtained in the same manner as in Example 1 except that the density of the negative electrode was made to be 0.95 g/cm$^3$ by changing the pressure at the time of rolling, and evaluated in the same manner as in Example 1. The results are shown in Table 1.

EXAMPLE 3

A secondary power source was obtained in the same manner as in Example 1 except that the density of the negative electrode was made to be 0.65 g/cm$^3$ by changing the pressure at the time of rolling, and evaluated in the same manner as in Example 1. The results are shown in Table 1.

EXAMPLE 4

A secondary power source was obtained in the same manner as in Example 1 except that the density of the negative electrode was made to be 1.1 g/cm$^3$ by changing he pressure at the time of rolling, and evaluated in the same manner as in Example 1. The results are shown in Table 1.

EXAMPLE 5

A secondary power source was obtained in the same manner as in Example 1 except that a solution having 0.9 mol/l of $LiN(SO_2C_2F_5)_2$ and 0.1 mol/l of $LiClO_4$ dissolved in a mixed solvent of ethylene carbonate and ethylmethyl carbonate (mass ratio 1:1) was used as the electrolyte, and evaluated in the same manner as in Example 1. The results are shown in Table 1.

EXAMPLE 6

A secondary power source was obtained in the same manner as in Example 1 except that the density of the negative electrode was made to be 0.55 g/cm$^3$ by changing the pressure at the time of rolling, and evaluated in the same manner as in Example 1. The results are shown in Table 1.

EXAMPLE 7

A secondary power source was obtained in the same manner as in Example 1 except that the density of the negative electrode was made to be 1.25 g/cm³ by changing the pressure at the time of rolling, and evaluated in the same manner as in Example 1. The results are shown in Table 1.

Here, FIG. 1 is a diagram illustrating the relation of the density of the negative electrode with the initial capacity and the change in capacity in Examples, from the results of Examples 1 to 4 and 6 and 7.

TABLE 1

|  | Initial capacity (m/Ah) | Change in capacity (%) |
|---|---|---|
| Example 1 | 1.24 | −6.7 |
| Example 2 | 1.31 | −7.4 |
| Example 3 | 1.12 | −6.4 |
| Example 4 | 1.35 | −8.5 |
| Example 5 | 1.36 | −3.6 |
| Example 6 | 1.01 | −6.3 |
| Example 7 | 1.39 | −11.7 |

According to the present invention, a secondary power source having a large capacity, a high upper limit voltage and high rapid charge and discharge cycle reliability, can be provided.

The entire disclosure of Japanese Patent Application No. 2001-63627 filed on Mar. 7, 2001 including specification, claims, drawings and summary are incorporated herein by reference in its entirety.

What is claimed is:

1. A secondary power source, which comprises:
a positive electrode consisting essentially of activated carbon, from 0.1 to 20% by weight of a conductive material, and 1 to 20% by weight of a binder based on the total mass of the positive electrode,
a negative electrode consisting essentially of a carbon material capable of doping and undoping lithium ions and 4 to 30% by weight of a binder based on the total mass of the negative electrode, and
an organic electrolyte containing a lithium salt,
wherein the negative electrode has a density of from 0.6 to 1.2 g/cm³.

2. The secondary power source according to claim 1, wherein the carbon material contained in the negative electrode has a lattice spacing of [002] face of from 0.335 to 0.410 nm as measured by X-ray diffraction.

3. The secondary power source according to claim 1, wherein the negative electrode contains vapor grown carbon fibers, and the carbon fibers are contained in an amount of from 5 to 30% based on the total mass of the negative electrode.

4. The secondary power source according to claim 3, wherein the carbon fibers have a lattice spacing of [002] face of from 0.336 to 0.337 nm as measured by X-ray diffraction.

5. The secondary power source according to claim 1, wherein the negative electrode contains a binder in an amount of from 5 to 30% based on the total mass of the negative electrode.

6. The secondary power source according to claim 5, wherein the binder is polyvinylidene fluoride.

7. The secondary power source according to claim 1, wherein the activated carbon has a specific surface area of from 800 to 3,000 m²/g.

8. The secondary power source according to claim 1, wherein the organic electrolyte comprises as a solvent at least one member selected from the group consisting of ethylene carbonate, propylene carbonate, butylene carbonate, dimethyl carbonate, ethylmethyl carbonate, diethyl carbonate, sulfolane and dimethoxyethane, and as the lithium salt at least one member selected from the group consisting of $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, $LiAsF_6$ and $LiSbF_6$.

9. The secondary power source according to claim 3, wherein the negative electrode contains a binder in an amount of from 5 to 30% based on the total mass of the negative electrode.

10. The secondary power source according to claim 9, wherein the binder is polyvinylidene fluoride.

11. A secondary power source, which comprises a positive electrode containing activated carbon, a negative electrode containing a carbon material capable of doping and undoping lithium ions, and an organic electrolyte containing a lithium salt, wherein the negative electrode has a density of from 0.7 to 1.0 g/cm³.

12. The secondary power source according to claim 11, wherein the carbon material contained in the negative electrode has a lattice spacing of [002] face of from 0.335 to 0.410 nm as measured by X-ray diffraction.

13. The secondary power source according to claim 11, wherein the negative electrode contains vapor grown carbon fibers, and the carbon fibers are contained in an amount of from 5 to 30% based on the total mass of the negative electrode.

14. The secondary power source according to claim 13, wherein the carbon fibers have a lattice spacing of [002] face of from 0.336 to 0.337 nm as measured by X-ray diffraction.

15. The secondary power source according to claim 11, wherein the negative electrode contains a binder in an amount of from 5 to 30% based on the total mass of the negative electrode.

16. The secondary power source according to claim 15, wherein the binder is polyvinylidene fluoride.

* * * * *